(12) United States Patent
Kawaguchi et al.

(10) Patent No.: US 8,785,336 B2
(45) Date of Patent: Jul. 22, 2014

(54) ALKALI-FREE GLASS

(75) Inventors: Takahiro Kawaguchi, Otsu (JP);
Shinkichi Miwa, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 13/415,889

(22) Filed: Mar. 9, 2012

(65) Prior Publication Data

US 2012/0282450 A1 Nov. 8, 2012

Related U.S. Application Data

(60) Provisional application No. 61/452,220, filed on Mar. 14, 2011.

(51) Int. Cl.
*C03C 3/091* (2006.01)
*C03C 3/093* (2006.01)
*C03C 3/095* (2006.01)
*C03C 3/097* (2006.01)

(52) U.S. Cl.
CPC ............ *C03C 3/091* (2013.01); *C03C 3/093* (2013.01); *C03C 3/095* (2013.01); *C03C 3/097* (2013.01)
USPC .................................. 501/66; 501/67

(58) Field of Classification Search
CPC ................ C03C 3/091; C03C 3/093
USPC ...................................... 501/66, 67
See application file for complete search history.

(56) References Cited

U.S. PATENT DOCUMENTS

| | | | |
|---|---|---|---|
| 5,770,535 A * | 6/1998 | Brix et al. ............... | 501/67 |
| 6,096,670 A | 8/2000 | Lautenschlager et al. | |
| 6,329,310 B1 * | 12/2001 | Peuchert et al. ........... | 501/66 |
| 7,833,919 B2 * | 11/2010 | Danielson et al. ........... | 501/66 |
| 8,187,715 B2 * | 5/2012 | Danielson et al. ........... | 428/432 |
| 8,445,394 B2 * | 5/2013 | Aitken et al. .............. | 501/66 |
| 2007/0191207 A1 * | 8/2007 | Danielson et al. ........... | 501/66 |
| 2012/0088648 A1 * | 4/2012 | Ellison et al. .............. | 501/59 |
| 2012/0149544 A1 * | 6/2012 | Nagai et al. ............... | 501/67 |

FOREIGN PATENT DOCUMENTS

| | | | |
|---|---|---|---|
| JP | 4-175242 A | | 6/1992 |
| JP | 04175242 | * | 6/1992 |
| JP | 11-157869 | | 6/1999 |
| JP | 2000-044278 | | 2/2000 |
| JP | 2000-302475 | | 10/2000 |
| JP | 4445176 | | 1/2010 |
| JP | 2010-275167 | | 12/2010 |
| WO | 01/00538 | | 1/2001 |

OTHER PUBLICATIONS

International Search Report issued May 22, 2012 in corresponding International (PCT) Application No. PCT/JP2012/055802.
International Preliminary Report on Patentability and Written Opinion, mailed Sep. 19, 2013 and May 22, 2012, respectively, in International (PCT) Application No. PCT/JP2012/055802.

* cited by examiner

*Primary Examiner* — Karl Group

(74) *Attorney, Agent, or Firm* — Wenderoth, Lind & Ponack, L.L.P.

(57) ABSTRACT

Provided is an alkali-free glass, comprising, as a glass composition in terms of mass %, 55 to 80% of $SiO_2$, 10 to 25% of $Al_2O_3$, 2 to 5.5% of $B_2O_3$, 3 to 8% of MgO, 3 to 10% of CaO, 0.5 to 5% of SrO, and 0.5 to 7% of BaO, having a molar ratio MgO/CaO of 0.5 to 1.5, being substantially free of alkali metal oxides, and having a Young's modulus of more than 80 GPa.

11 Claims, No Drawings

ALKALI-FREE GLASS

This application claims the benefit of U.S. Provisional Application No. 61/452,220, filed Mar. 14, 2011.

TECHNICAL FIELD

The present invention relates to an alkali-free glass, and more particularly, to an alkali-free glass suitable for an OLED display.

BACKGROUND ART

Electronic devices such as an OLED display, which are thin, excellent in moving picture display performance, and low in power consumption, are used for applications such as a display for a portable phone.

A glass sheet is widely used as a substrate for an OLED display. A glass sheet used for this application needs to have the following main characteristics.
(1) To be substantially free of alkali metal oxides in order to prevent alkali ions from diffusing in a semiconductor film formed in a heat treatment process.
(2) To be excellent in productivity and be excellent particularly in devitrification resistance and meltability in order to produce a glass sheet at low cost.
(3) To have a high strain point in order to reduce heat shrinkage of a glass sheet in a low temperature poly silicon (LTPS) process.

Meanwhile, the OLED display is mainly used for a mobile product at present, but is expected to be developed into an application for an OLED television in the future. Some manufacturers have already begun marketing the OLED television.

A panel size of the OLED television is significantly large in comparison to that of the mobile product. Thus, it is expected that a demand for producing a larger and thinner glass sheet increases in the future.

CITATION LIST

Patent Literature 1: JP 4445176 B2

SUMMARY OF INVENTION

Technical Problem

As a glass sheet becomes larger and thinner, the glass sheet is liable to deflect, resulting in easy occurrence of various failures.

In glass manufacturers, after a glass sheet is formed, the glass sheet goes through steps such as cutting, annealing, inspecting, and washing steps, during which the glass sheet is placed in a cassette provided with a plurality of shelves in a vertical direction and is transferred. This cassette usually has a structure in which shelves are provided at the right and left inner surfaces and both edges opposed to each other of a glass sheet are placed on the shelves so that the glass sheet can be properly held in a horizontal direction. However, a large and thin glass sheet has a large deflection amount. Thus, when the glass sheet is placed in the cassette, part of the glass sheet comes into contact with the cassette, resulting in breakage of the glass sheet, or when the glass sheet is transferred, the glass sheet significantly swings and is liable to be unstably held. A cassette having a similar structure is used in electronic device manufacturers as well, with the result that similar failures may occur.

In addition, as an electronic device becomes larger and thinner, a glass sheet mounted in the electronic device is apt to deflect, and hence images of the electronic device may look distorted.

In order to solve the above-mentioned problem, studies have been made on a method of reducing a deflection amount of a glass sheet by increasing a specific Young's modulus (Young's modulus/density) or a Young's modulus of the glass sheet. For example, Patent Literature 1 discloses an alkali-free glass having a specific Young's modulus of 31 GPa or more and a Young's modulus of 76 GPa or more. However, the alkali-free glass described in Patent Literature 1 has a small content of each of SrO and BaO, and hence the alkali-free glass has low devitrification resistance and is liable to devitrify at the time of being formed into a glass sheet. In order to enhance devitrification resistance of glass, a content of $B_2O_3$ needs to be increased, but $B_2O_3$ is a component that lowers both the Young's modulus and strain point of glass. When the Young's modulus and strain point of glass are lower, the resultant glass sheet is liable to undergo heat shrinkage in an LIPS process, and when a larger and thinner glass sheet is produced, failures attributed to deflection of the glass sheet may occur.

Thus, a technical object of the present invention is to devise an alkali-free glass which is excellent in productivity (in particular, devitrification resistance) and has a sufficiently high strain point and a sufficiently high Young's modulus for the purposes of producing a glass sheet at low cost, suppressing heat shrinkage of a glass sheet in an LIPS process, and preventing, even at the time of producing a larger and thinner glass sheet, failures attributed to deflection of the glass sheet.

Solution to Problem

The inventors of the present invention have repeatedly performed various experiments. As a result, the inventors have found that the technical object can be achieved by restricting a range of a glass composition of an alkali-free glass within a predetermined range and restricting glass properties within a predetermined range. Thus, the inventors propose the finding as the present invention. That is, an alkali-free glass of the present invention comprises, as a glass composition in terms of mass %, 55 to 80% of $SiO_2$, 10 to 25% of $Al_2O_3$, 2 to 5.5% of $B_2O_3$, 3 to 8% of MgO, 3 to 10% of CaO, 0.5 to 5% of SrO, and 0.5 to 7% of BaO, has a molar ratio MgO/CaO of 0.5 to 1.5, is substantially free of alkali metal oxides, and has a Young's modulus of more than 80 GPa. Herein, the phrase "substantially free of alkali metal oxides" refers to a case where a content of alkali metal oxides ($Li_2O$, $Na_2O$, and $K_2O$) in a glass composition is 1,000 ppm (by mass) or less. The term "Young's modulus" refers to a value obtained by measurement using a bending resonance method. Note that 1 GPa is equivalent to about 101.9 Kgf/$mm^2$.

The glass composition range of the alkali-free glass of the present invention is restricted as described above. As a result, the devitrification resistance, strain point, and Young's modulus of the alkali-free glass can be improved sufficiently. Particularly when the molar ratio MgO/CaO is restricted to 0.5 to 1.5, the devitrification resistance and Young's modulus can be improved remarkably.

Second, the alkali-free glass of the present invention preferably further comprises 0.001 to 1 mass % of $SnO_2$.

Third, the alkali-free glass of the present invention preferably has a strain point of more than 680° C. Herein, the term "strain point" refers to a value obtained by measurement based on the method in accordance with ASTM C336.

Fourth, the alkali-free glass of the present invention preferably has a liquidus temperature of less than 1,210° C. Herein, the "liquidus temperature" may be calculated by measuring a temperature at which crystals of glass are deposited after glass powders that passed through a standard 30-mesh sieve (500 μm) and remained on a 50-mesh sieve (300 μm) are placed in a platinum boat and then kept for 24 hours in a gradient heating furnace.

Fifth, the alkali-free glass of the present invention preferably has an average thermal expansion coefficient in the temperature range of 30 to 380° C. of 30 to $50\times10^{-7}$/° C. Herein, the "average thermal expansion coefficient in the temperature range of 30 to 380° C." is a value calculated from values obtained by measurement with a dilatometer.

Sixth, the alkali-free glass of the present invention preferably has a temperature at $10^{2.5}$ poise of less than 1,600° C. Herein, the "temperature at $10^{2.5}$ poise" may be measured by a platinum sphere pull up method.

Seventh, the alkali-free glass of the present invention preferably has a viscosity at a liquidus temperature of $10^{4.8}$ poise or more. Note that the "viscosity at a liquidus temperature" may be measured by a platinum sphere pull up method.

Eighth, the alkali-free glass of the present invention is preferably formed by an overflow down-draw method.

Ninth, the alkali-free glass of the present invention preferably has a thickness of less than 0.5 mm.

Tenth, the alkali-free glass of the present invention is preferably used for an OLED device.

DESCRIPTION OF EMBODIMENTS

An alkali-free glass according to an embodiment of the present invention comprises, as a glass composition in terms of mass %, 55 to 80% of $SiO_2$, 10 to 25% of $Al_2O_3$, 2 to 5.5% of $B_2O_3$, 3 to 8% of MgO, 3 to 10% of CaO, 0.5 to 5% of SrO, and 0.5 to 7% of BaO, has a molar ratio MgO/CaO of 0.5 to 1.5, and is substantially free of alkali metal oxides. The reasons for limiting the range of the content of each component as described above are described below. Note that the expression "%" refers to "mass %" in the description of the content of each component unless otherwise stated.

$SiO_2$ is a component that forms the skeleton of glass. The content of $SiO_2$ is 55 to 80%, preferably 55 to 75%, more preferably 55 to 70%, still more preferably 55 to 65%. When the content of $SiO_2$ is too small, it becomes difficult to increase a Young's modulus. Further, acid resistance becomes liable to lower and a density becomes too high. On the other hand, when the content of $SiO_2$ is too large, a viscosity becomes higher, meltability is liable to lower, devitrified crystals of cristobalite and the like are liable to precipitate, and a liquidus temperature becomes liable to increase.

$Al_2O_3$ is a component that forms the skeleton of glass, is a component that increases the Young's modulus, and moreover, is a component that suppresses phase separation. The content of $Al_2O_3$ is 10 to 25%, preferably 12 to 20%, more preferably 14 to 20%. When the content of $Al_2O_3$ is too small, the Young's modulus is liable to lower, and the glass is liable to undergo phase separation. On the other hand, when the content of $Al_2O_3$ is too large, devitrified crystals such as mullite and anorthite are liable to precipitate, and the liquidus temperature is liable to increase.

$B_2O_3$ is a component that enhances the meltability and enhances devitrification resistance. The content of $B_2O_3$ is 2 to 5.5%, preferably 2.5 to 5.5%, more preferably 3 to 5.5%, still more preferably 3 to 5%. When the content of $B_2O_3$ is too small, the meltability and the devitrification resistance are liable to lower, and in addition, resistance to a hydrofluoric acid-based chemical liquid is liable to lower. On the other hand, when the content of $B_2O_3$ is too large, the Young's modulus and the acid resistance are liable to lower.

MgO is a component that lowers the viscosity and enhances the meltability, and is a component that remarkably increases the Young's modulus among alkaline-earth metal oxides. The content of MgO is 3 to 8%, preferably 3.5 to 8%, more preferably 4 to 8%, still more preferably 4.5 to 8%, particularly preferably 5 to 8%. When the content of MgO is too small, the meltability and the Young's modulus are liable to lower. On the other hand, when the content of MgO is too large, the devitrification resistance is liable to lower.

CaO is a component that lowers the viscosity and remarkably enhances the meltability without lowering a strain point. CaO is also a component that contributes to reducing raw material cost, because a raw material for introducing the component is relatively inexpensive among alkaline-earth metal oxides. The content of CaO is 3 to 10%, preferably 3.5 to 9%, more preferably 4 to 8.5%, still more preferably 4 to 8%, particularly preferably 4 to 7.5%. When the content of CaO is too small, it becomes difficult to receive the benefit of the effects. On the other hand, when the content of CaO is too large, the glass is liable to devitrify.

SrO is a component that suppresses the phase separation of glass and enhances the devitrification resistance. SrO is also a component that lowers the viscosity and enhances the meltability without lowering the strain point, and moreover, is a component that suppresses the elevation of the liquidus temperature. The content of SrO is 0.5 to 5%, preferably 0.5 to 4%, more preferably 0.5 to 3.5%. When the content of SrO is too small relative to 0.5%, it becomes difficult to receive the benefit of the effects. On the other hand, when the content of SrO is too large, strontium silicate-based devitrified crystals are liable to precipitate and the devitrification resistance is liable to lower.

BaO is a component that enhances the devitrification resistance. The content of BaO is 0.5 to 7%, preferably 0.5 to 6%, more preferably 0.5 to 5%, still more preferably 0.5 to 4.5%. When the content of BaO is too small, it becomes difficult to receive the benefit of the effects. On the other hand, when the content of BaO is too large, the viscosity becomes too high, the meltability is liable to lower, devitrified crystals containing BaO are liable to precipitate, and the liquidus temperature is liable to increase.

The molar ratio CaO/MgO is a component ratio which is important for striking a balance between a high Young's modulus and high devitrification resistance and for reducing the production cost of a glass sheet. The molar ratio CaO/MgO is 0.5 to 1.5, preferably 0.5 to 1.3, 0.5 to 1.2, 0.5 to 1.1, particularly preferably 0.5 to 1.0. When the molar ratio CaO/MgO is too small, devitrified crystals of cristobalite are liable to precipitate, with the result that the devitrification resistance is liable to lower, and moreover, the raw material cost is liable to soar. On the other hand, when the molar ratio CaO/MgO is too large, devitrified crystals of alkaline-earth aluminosilicate-based compounds such as anorthite are liable to precipitate, with the result that the devitrification resistance is liable to lower, and moreover, it becomes difficult to increase the Young's modulus.

In addition to the above-mentioned components, the following components, for example, may be added as arbitrary components. Note that the total content of the components except the above-mentioned components is preferably 10% or less, particularly preferably 5% or less, from the standpoint of surely receiving the benefit of the effects of the present invention.

ZnO is a component that enhances the meltability. However, when ZnO is comprised in a large amount, the glass is liable to devitrify and the strain point is liable to lower. The content of ZnO is preferably 0 to 5%, 0 to 4%, 0 to 3%, particularly preferably 0 to 2%.

$SnO_2$ is a component that has a good fining action, is a component that increases the strain point, and is a component that lowers the viscosity in a high temperature range. The content of $SnO_2$ is preferably 0 to 1%, 0.001 to 1%, 0.01 to 0.5%, particularly preferably 0.05 to 0.3%. When the content of $SnO_2$ is too large, a devitrified crystal of $SnO_2$ is liable to precipitate. Note that, when the content of $SnO_2$ is less than 0.001%, it becomes difficult to receive the benefit of the effects.

As described above, $SnO_2$ is suitable as a fining agent. In addition, it is possible to add, as a fining agent, F, Cl, $SO_3$, C, or a metal powder containing Al, Si, or the like up to 5% each, as long as the characteristics of glass are not impaired. Besides, it is also possible to add, as a fining agent, $CeO_2$ or the like up to 5%.

$As_2O_3$ and $Sb_2O_3$ are also effective as fining agents. It is not completely excluded that the alkali-free glass of the present invention comprises those components, but it is preferred that those components be not used if their use can be avoided, from an environmental point of view. Further, when $As_2O_3$ is comprised in a large amount, solarization resistance tends to lower. The content of $As_2O_3$ is preferably 1% or less, 0.5% or less, particularly preferably 0.1% or less, and it is desirable that the glass be substantially free of $As_2O_3$. Herein, the phrase "substantially free of $As_2O_3$" refers to a case where the content of $As_2O_3$ in a glass composition is less than 0.05%. Further, the content of $Sb_2O_3$ is preferably 1% or less, particularly preferably 0.5% or less, and it is desirable that the glass be substantially free of $Sb_2O_3$. Herein, the phrase "substantially free of $Sb_2O_3$" refers to a case where the content of $Sb_2O_3$ in a glass composition is less than 0.05%.

Cl has an effect of promoting the meltability of an alkali-free glass, and hence, if Cl is added in glass, a melting temperature can be made lower, the action of a fining agent is promoted, and consequently, it is possible to attain the longer life of a glass production furnace while melting cost is reduced. However, when the content of Cl is too large, the strain point is liable to lower, and hence the content of Cl is preferably 3% or less, 1% or less, particularly preferably 0.5% or less. Note that it is possible to use, as a raw material for introducing Cl, a raw material such as a chloride of an alkaline-earth metal oxide, for example, strontium chloride, or aluminum chloride.

$P_2O_5$ is a component that increases the strain point and is a component that is capable of remarkably suppressing the precipitation of devitrified crystals of alkaline-earth aluminosilicate-based compounds such as anorthite. Note that, if $P_2O_5$ is comprised in a large amount, the glass is liable to undergo phase separation. The content of $P_2O_5$ is 0 to 2.5%, preferably 0 to 1.5%, more preferably 0 to 0.5%, still more preferably 0 to 0.3%.

$TiO_2$ is a component that lowers the viscosity and enhances the meltability, and is a component that suppresses the solarization. However, if $TiO_2$ is comprised in a large amount, the glass is colored and the transmittance is liable to lower. The content of $TiO_2$ is preferably 0 to 5%, 0 to 3%, 0 to 1%, particularly preferably 0 to 0.02%.

$Y_2O_3$, $Nb_2O_5$, and $La_2O_3$ have functions of increasing the strain point, the Young's modulus, and the like. However, if the content of each of those components is more than 5%, the density is liable to increase.

The alkali-free glass of the present invention has a strain point of preferably more than 680° C., 685° C. or more, 690° C. or more, particularly preferably 695° C. or more. With such strain point, it is possible to suppress the heat shrinkage of the resultant glass sheet in an LTPS process.

The alkali-free glass of the present invention has a Young's modulus of more than 80 GPa, preferably 82 GPa or more, 83 GPa or more, particularly preferably 83.5 GPa or more. When the Young's modulus is too low, failures attributed to the deflection of the glass sheet are liable to occur.

The alkali-free glass according to this embodiment has an average thermal expansion coefficient in the temperature range of 30 to 380° C. of preferably 30 to $50\times10^{-7}/°$ C., to $50\times10^{-7}/°$ C., 33 to $50\times10^{-7}/°$ C., 34 to $50\times10^{-7}/°$ C., particularly preferably 35 to $50\times10^{-7}/°$ C. With such value, the average thermal expansion coefficient of the alkali-free glass can be easily matched with the thermal expansion coefficient of Si used in a TFT.

The alkali-free glass according to this embodiment has a liquidus temperature of preferably less than 1,210° C., 1,200° C. or less, particularly preferably 1,190° C. or less. With such liquidus temperature, a situation in which a devitrified crystal is generated during glass production to decrease productivity is easily prevented. Further, the glass can be easily formed into a glass sheet by an overflow down-draw method, with the result that the surface quality of the glass sheet can be easily improved, and the production cost of the glass sheet can be lowered. Note that the liquidus temperature is an index of devitrification resistance, and as the liquidus temperature of glass is lower, the glass is more excellent in devitrification resistance.

In recent years, along with the development of a high-definition display, a finer circuit pattern has tended to be developed as well. Thus, fine foreign matter which did not cause any problem in the past is becoming a cause for wiring disconnection or a short circuit. From the standpoint of preventing the problem described above as well, the significance of improving devitrification resistance is great.

The alkali-free glass according to this embodiment has a viscosity at a liquidus temperature of preferably $10^{4.8}$ poise or more, $10^{5.0}$ poise or more, $10^{5.2}$ poise or more, particularly preferably $10^{5.5}$ poise or more. With such viscosity, the devitrification of the glass hardly occurs during shape formation, and hence, the glass can be easily formed into a glass sheet by an overflow down-draw method, with the result that the surface quality of the glass sheet can be enhanced, and the production cost of the glass sheet can be lowered. Note that the viscosity at the liquidus temperature is an index of formability, and as the viscosity at the liquidus temperature is higher, the formability is more improved.

The alkali-free glass according to this embodiment has a temperature at $10^{2.5}$ poise of preferably 1,600° C. or less, 1,580° C. or less, particularly preferably 1,570° C. or less. If the temperature at $10^{2.5}$ poise becomes high, the glass is difficult to melt, and as a result, the production cost of a glass sheet soars. Note that the temperature at $10^{2.5}$ poise corresponds to the melting temperature, and as the temperature is lower, the meltability is more improved.

The alkali-free glass according to this embodiment is preferably formed by an overflow down-draw method. The overflow down-draw method refers to a method in which a molten glass is caused to overflow from both sides of a heat-resistant, trough-shaped structure, and the overflowing molten glasses are subjected to down-draw downward at the lower end of the trough-shaped structure while being joined, to thereby produce a glass sheet. When a glass sheet is produced by the overflow down-draw method, surfaces that are to serve as the surfaces of the glass sheet are formed in a state of free surfaces without being brought into contact with the trough-shaped refractory. As a result, it is possible to produce a glass sheet having a good surface quality without polishing at low cost and the thinning of the glass sheet is easily performed as well. Note that the structure and material of the trough-shaped structure that is used in the overflow down-draw method are not particularly limited as long as a desired dimension and surface accuracy of the resultant glass sheet can be realized. Further, a method of applying a force to glass at the time of performing down-draw downward is also not particularly limited. For example, there may be adopted a method involving rotating a heat-resistant roll having a sufficiently large width in a state of being in contact with glass, to thereby draw the glass, or a method involving allowing a plurality of pairs of heat-resistant rolls to come into contact with only the vicinities of end surfaces of glass, to thereby draw the glass.

It is also possible to form a glass sheet by, for example, a down-draw method (slot down method or the like), a float method, or the like, besides the overflow down-draw method.

The thickness of the alkali-free glass according to this embodiment is not particularly limited, and is preferably less than 0.5 mm, 0.4 mm or less, 0.35 mm or less, particularly preferably 0.3 mm or less. As the thickness is thinner, the weight of a device using the alkali-free glass can be reduced accordingly. The thickness can be adjusted by controlling, for example, the glass flow rate and the sheet-drawing speed at the time of producing a glass sheet.

The alkali-free glass according to this embodiment is preferably used for OLED devices, in particular, for OLED displays. Particularly when the alkali-free glass is used for televisions, a plurality of devices are prepared on a glass sheet and the resultant is then divided and cut into individual devices, thereby reducing the production cost (so-called multiple patterning). The alkali-free glass of the present invention has a low liquidus temperature and a high viscosity at the liquidus temperature, and hence can be easily formed into a large glass sheet. Thus, the alkali-free glass can satisfy such demand.

EXAMPLES

Hereinafter, the present invention is described with reference to examples. However, the following examples are merely examples, and the present invention is by no means limited thereto.

Tables 1 and 2 show examples of the present invention (Sample Nos. 1 to 13) and comparative examples (Sample Nos. 14 and 15).

TABLE 1

| | | Examples | | | | | | | |
|---|---|---|---|---|---|---|---|---|---|
| | | No. 1 | No. 2 | No. 3 | No. 4 | No. 5 | No. 6 | No. 7 | No. 8 |
| Glass composition (wt %) | $SiO_2$ | 57.5 | 61.0 | 61.0 | 61.0 | 61.0 | 61.0 | 60.0 | 59.0 |
| | $Al_2O_3$ | 17.7 | 18.7 | 18.8 | 18.7 | 18.7 | 19.2 | 19.7 | 20.7 |
| | $B_2O_3$ | 4.0 | 3.0 | 3.0 | 3.0 | 3.0 | 3.0 | 3.0 | 3.0 |
| | $P_2O_5$ | — | — | 0.6 | — | — | — | — | — |
| | MgO | 7.5 | 5.3 | 4.6 | 4.8 | 4.8 | 4.8 | 4.8 | 4.8 |
| | CaO | 8.0 | 5.7 | 4.9 | 5.2 | 5.2 | 5.2 | 5.2 | 5.2 |
| | SrO | — | 1.0 | 1.0 | 2.0 | 1.0 | 1.0 | 1.0 | 1.0 |
| | BaO | 5.0 | 5.0 | 5.0 | 5.0 | 6.0 | 5.0 | 6.0 | 6.0 |
| | $Y_2O_3$ | — | — | 0.8 | — | — | 0.5 | — | — |
| | $SnO_2$ | 0.3 | 0.3 | 0.3 | 0.3 | 0.3 | 0.3 | 0.3 | 0.3 |
| Molar ratio CaO/MgO | | 0.77 | 0.77 | 0.77 | 0.78 | 0.78 | 0.78 | 0.78 | 0.78 |
| Density [g/cm$^3$] | | 2.61 | 2.57 | 2.56 | 2.57 | 2.57 | 2.53 | 2.58 | 2.59 |
| CTE [×10$^{-7}$/° C.] | | 44.2 | 39.2 | 37.0 | 39.0 | 38.4 | 38.0 | 37.9 | 38.6 |
| Young's modulus [GPa] | | 83.0 | 83.5 | 83.0 | 83.5 | 83.5 | 84.0 | 84.0 | 84.5 |
| Ps [° C.] | | 690 | 715 | 720 | 720 | 720 | 725 | 720 | 725 |
| Ta [° C.] | | 740 | 770 | 780 | 775 | 775 | 780 | 775 | 780 |
| Ts [° C.] | | 940 | 990 | 1,005 | 1,000 | 1,000 | 1,000 | 1,000 | 1,000 |
| $10^4$ dPa·s [° C.] | | 1,200 | 1,290 | 1,310 | 1,300 | 1,305 | 1,305 | 1,295 | 1,290 |
| $10^3$ dPa·s [° C.] | | 1,330 | 1,440 | 1,480 | 1,455 | 1,460 | 1,455 | 1,450 | 1,440 |
| $10^{2.5}$ dPa·s [° C.] | | 1,420 | 1,545 | 1,585 | 1,555 | 1,560 | 1,555 | 1,545 | 1,535 |
| TL [° C.] | | 1,120 | 1,190 | 1,210 | 1,180 | 1,180 | 1,185 | 1,185 | 1,195 |
| $Log_{10}\eta TL$ | | 4.8 | 4.9 | 4.9 | 5.1 | 5.1 | 5.1 | 5.0 | 4.9 |

TABLE 2

| | | Examples | | | | | Comparative Examples | |
|---|---|---|---|---|---|---|---|---|
| | | No. 9 | No. 10 | No. 11 | No. 12 | No. 13 | No. 14 | No. 15 |
| Glass composition (wt %) | $SiO_2$ | 59.0 | 58.5 | 61.0 | 61.0 | 61.0 | 64.1 | 62.4 |
| | $Al_2O_3$ | 20.2 | 20.7 | 19.2 | 19.2 | 19.2 | 19.0 | 14.9 |
| | $B_2O_3$ | 3.0 | 3.0 | 3.0 | 3.0 | 3.0 | 4.0 | 2.0 |
| | $P_2O_5$ | 0.5 | 0.5 | — | — | — | — | — |
| | MgO | 4.8 | 4.8 | 4.8 | 4.8 | 4.8 | 6.1 | — |
| | CaO | 5.2 | 5.2 | 4.7 | 3.7 | 3.7 | 6.5 | 9.4 |
| | SrO | 1.0 | 1.0 | 1.0 | 2.0 | 1.0 | — | 2.0 |
| | BaO | 6.0 | 6.0 | 6.0 | 6.0 | 7.0 | — | 9.0 |
| | $Y_2O_3$ | — | — | — | — | — | — | — |
| | $SnO_2$ | 0.3 | 0.3 | 0.3 | 0.3 | 0.3 | 0.3 | 0.3 |

TABLE 2-continued

|  | Examples | | | | | Comparative Examples | |
| --- | --- | --- | --- | --- | --- | --- | --- |
|  | No. 9 | No. 10 | No. 11 | No. 12 | No. 13 | No. 14 | No. 15 |
| Molar ratio CaO/MgO | 0.78 | 0.78 | 0.70 | 0.55 | 0.55 | 0.77 | — |
| Density [g/cm$^3$] | 2.58 | 2.59 | 2.57 | 2.57 | 2.57 | 2.47 | 2.63 |
| CTE [×10$^{-7}$/° C.] | 38.0 | 38.6 | 37.3 | 36.4 | 36.5 | 35.5 | 44.9 |
| Young's modulus [GPa] | 84.0 | 84.0 | 83.5 | 83.5 | 83.0 | 85.0 | 78.5 |
| Ps [° C.] | 720 | 720 | 720 | 725 | 725 | 715 | 710 |
| Ta [° C.] | 775 | 775 | 775 | 780 | 780 | 770 | 770 |
| Ts [° C.] | 995 | 1,000 | 1,005 | 1,010 | 1,010 | 990 | 1,000 |
| 10$^4$ dPa·s [° C.] | 1,290 | 1,285 | 1,305 | 1,315 | 1,315 | 1,285 | 1,330 |
| 10$^3$ dPa·s [° C.] | 1,445 | 1,435 | 1,465 | 1,470 | 1,470 | 1,440 | 1,505 |
| 10$^{2.5}$ dPa·s [° C.] | 1,540 | 1,530 | 1,565 | 1,570 | 1,570 | 1,535 | 1,615 |
| TL [° C.] | 1,195 | 1,200 | 1,185 | 1,205 | 1,210 | >1,300 | 1,185 |
| Log$_{10}$ηTL | 4.9 | 4.8 | 5.1 | 5.0 | 5.0 | Unmeasured | 5.2 |

First, a glass batch prepared by blending glass raw materials so that each glass composition listed in the tables was attained was placed in a platinum crucible, and then melted at 1,600 to 1,650° C. for 24 hours. When the glass batch was dissolved, molten glass was stirred by using a platinum stirrer to homogenize it. Next, the molten glass was poured on a carbon sheet and formed into a glass sheet, followed by annealing for 30 minutes at a temperature close to the annealing temperature. Each of the resultant samples was evaluated for its density, average thermal expansion coefficient CTE in the temperature range of 30 to 380° C., strain point Ps, annealing temperature Ta, softening temperature Ts, temperature at a viscosity of 10$^4$ dPa·s, temperature at a viscosity of 10$^3$ dPa·s, temperature at a viscosity of 10$^{2.5}$ dPa·s, liquidus temperature TL, and viscosity Log$_{10}$ ηTL at the liquidus temperature TL.

The density is a value obtained by measurement by the well-known Archimedes method.

The average thermal expansion coefficient CTE in the temperature range of 30 to 380° C. is a value calculated from values obtained by measurement with a dilatometer.

The strain point Ps, the annealing temperature Ta, and the softening temperature Is are values obtained by measurement based on the method of ASTM C336.

The temperatures at viscosities of 10$^4$ dPa·s, 10$^3$ dPa·s, and 10$^{2.5}$ dPa·s are values obtained by measurement by a platinum sphere pull up method.

The liquidus temperature TL is a value obtained by measuring a temperature at which crystals of glass are deposited after glass powders that passed through a standard 30-mesh sieve (500 μm) and remained on a 50-mesh sieve (300 μm) are placed in a platinum boat and then kept for 24 hours in a gradient heating furnace.

The viscosity Log$_{10}$ηTL at the liquidus temperature is a value obtained by measuring the viscosity of glass at the liquidus temperature TL by a platinum sphere pull up method.

As evident from Tables 1 and 2, as the glass composition of each of Sample Nos. 1 to 13 is restricted to a predetermined range, Sample Nos. 1 to 13 each have a Young's modulus of 80 GPa or more, a strain point of 680° C. or more, and a liquidus temperature of 1,210° C. or less. As a result, heat shrinkage in an LTPS process can be reduced, and even at the time of producing a larger and thinner glass sheet using any of Sample Nos. 1 to 13, failures attributed to the deflection of the glass sheet do not easily occur. Therefore, it is considered that any of Sample Nos. 1 to 13 is suitably used for producing a substrate for an OLED display.

On the other hand, as the glass composition of Sample No. 14 was not restricted to the predetermined range, Sample No. 14 had a high liquidus temperature and low devitrification resistance. Thus, Sample No. 14 has inferior formability, and fine foreign matter may deteriorate the quality and reliability of a display in which Sample No. 14 is used. Further, as the glass composition of Sample No. 15 was not restricted to the predetermined range, Sample No. 15 had a high temperature at 10$^{2.5}$ dPa·s and a low Young's modulus. Thus, Sample No. 15 has inferior meltability, and when a larger and thinner glass sheet using Sample No. 15 is produced, failures attributed to the deflection of the glass sheet may occur.

Industrial Applicability

The alkali-free glass of the present invention is suitable for, for example, a flat panel display substrate for a liquid crystal display, an OLED display, or the like, a cover glass for an image sensor such as a charge coupled device (CCD) or a contact image sensor (CIS), a substrate and cover glass for a solar cell, and a substrate for an OLED lighting device, and in particular, is suitable as a substrate for an OLED display.

The invention claimed is:

1. An alkali-free glass, comprising, as a glass composition in terms of mass %, 55 to 80% of $SiO_2$, 10 to 25% of $Al_2O_3$, 2 to 5.5% of $B_2O_3$, 4 to 8% of MgO, 3 to 7.5% of CaO, 0 to 5% of SrO, 0.5 to 7% of BaO, and 0 to 2% of ZnO, having a molar ratio MgO/CaO of 0.5 to 1.3, being substantially free of alkali metal oxides, having a Young's modulus of more than 80 GPa, having a liquidus temperature of 1,195° C. or less, and having an average thermal expansion coefficient in a temperature range of 30 to 380° C. of 30 to 44.2×10$^{-7}$/° C.

2. The alkali-free glass according to claim 1, further comprising 0.001 to 1 mass % of $SnO_2$.

3. The alkali-free glass according to claim 1, wherein the alkali-free glass has a strain point of more than 680° C.

4. The alkali-free glass according to claim 1, wherein the alkali-free glass has a liquidus temperature of less than 1,195° C.

5. The alkali-free glass according to claim 1, wherein the alkali-free glass has an average thermal expansion coefficient in a temperature range of 30 to 380° C. of 30 to 39.2×10$^{-7}$/° C.

6. The alkali-free glass according to claim 1, wherein the alkali-free glass has a temperature at 10$^{2.5}$ poise of less than 1,600° C.

7. The alkali-free glass according to claim 1, wherein the alkali-free glass has a viscosity at a liquidus temperature of 10$^{4.8}$ poise or more.

8. The alkali-free glass according to claim 1, wherein the alkali-free glass is formed by an overflow down-draw method.

9. The alkali-free glass according to claim 1, wherein the alkali-free glass has a thickness of less than 0.5 mm.

10. The alkali-free glass according to claim 1, wherein the alkali-free glass is used for an OLED device.

11. The alkali-free glass according to claim 1, wherein the alkali-free glass comprises in terms of mass %, 4.5 to 8% of MgO.

* * * * *